United States Patent [19]

Seckora

[11] Patent Number: 5,465,222
[45] Date of Patent: Nov. 7, 1995

[54] BARREL SHIFTER OR MULTIPLY/DIVIDE IC STRUCTURE

[75] Inventor: Michael C. Seckora, Gales Creek, Oreg.

[73] Assignee: Tektronix, Inc., Wilsonville, Oreg.

[21] Appl. No.: 195,428

[22] Filed: Feb. 14, 1994

[51] Int. Cl.$^6$ .............................. G06F 7/00; G06F 15/00
[52] U.S. Cl. .................................. 364/715.08; 364/715.01
[58] Field of Search ......................... 364/715.08, 715.01, 364/754, 757, 728.01, 728.02–728.07

[56] References Cited

U.S. PATENT DOCUMENTS

| | | | |
|---|---|---|---|
| 4,602,349 | 7/1986 | Blackley et al. | 364/728 |
| 4,896,287 | 1/1990 | O'Donnell et al. | 364/754 |
| 4,931,971 | 6/1990 | Cook et al. | 364/715.08 |
| 4,980,853 | 12/1990 | Hutchins | 364/259.5 |
| 4,984,189 | 1/1991 | Neki | 364/715.08 |
| 5,155,698 | 10/1992 | Niimi | 364/715.08 |

Primary Examiner—Roy N. Envall, Jr.
Assistant Examiner—Emmanuel L. Moise
Attorney, Agent, or Firm—Francis I. Gray

[57] ABSTRACT

A barrel shifter or multiply/divide integrated circuit (IC) structure includes a plurality of stages in series. The number of stages is a function of the number of bits in an input digital data word, and each stage in sequence provides for a different power of two rotary or multiply/divide shift of the digital data word at the input if selected. A multiplexer in each stage selects as an output either the shifted digital data word or the input digital data word for output to the next stage according to a shift amount select command. At the input and output of the series of stages an additional reversal multiplexer selects in response to a shift direction command either the digital data word or a reversed version of the digital data word, which determines the effective direction of the shift in the stages. Logic may be included in each stage to determine whether the shift operation is a rotary or multiply/divide shift operation.

3 Claims, 2 Drawing Sheets

5,465,222

BARREL SHIFTER OR MULTIPLY/DIVIDE IC STRUCTURE

BACKGROUND OF THE INVENTION

The present invention relates to the shifting of digital data, and more particularly to a barrel shifter or multiply/divide integrated circuit (IC) structure.

In many digital circuit designs barrel shifters are used to shift digital data words, and shifting of the digital data words is also used to perform $2^N$ multiply and divide operations. A typical barrel shifter has an array of one-bit multiplexers in a plurality of planes, one plane for each bit of the digital data word to be shifted. The digital data word is input in parallel to each plane, where $2^N$ is the number of bits and planes and each plane has N stages. The number of multiplexers in the first stage of each plane is $2^N$, in the next stage $2^{N-1}$, until in the last stage it is $2^0$. Each plane outputs one of the bits of the digital data word, with the order being determined by the select commands to the multiplexers. This configuration requires $2^N \times 2^N$ multiplexers.

For multiply/divide operations the digital data word may be loaded in parallel to a shift register, serially shifted by the appropriate number of clock pulses in either direction, depending upon whether a multiply or divide is desired, and then read out in parallel. Alternatively the digital data word may be loaded into the shift register serially, shifted the appropriate number of clock pulses, and the result read out either serially or in parallel. Such multiplication and division is not efficient because the time that it takes to perform the operation is determined by the number of clock pulses necessary. Using a barrel shifting circuit may be used by selecting for the most or least significant bits at the output the desired bits corresponding to the desired multiplication or division and replacing the remaining bit positions with zero. However as pointed out above this requires a large number of multiplexers.

On an integrated circuit real estate is generally a scarce commodity as more and more functions are sought to be provided within a limited area. Therefore it would be advantageous to implement a fast barrel shifter or multiply/divide circuit in an efficient manner that reduces the number of multiplexers needed.

SUMMARY OF THE INVENTION

Accordingly the present invention provides a barrel shifter or multiply/divide integrated circuit (IC) structure that significantly reduces the number of one-bit multiplexers required. A digital data word to be barrel shifted or multiplied/divided is input to an input multiplexer that selects either the digital data word or a flipped version of the digital data word for input to the first of a series of shift stages. The number of stages is determined by the number of bits in the digital data word, with each stage in the series in order reducing the number of bits shifted by one-half. Each stage may output to the next stage either the shifted digital data word from the input or the digital data word at the input as determined by a stage multiplexer. A shift amount command selects the stage multiplexer inputs that are output to the next stage according to the desired amount of shift desired. At the output of the last stage an output multiplexer selects either the final shifted digital data word or a flipped version of the final shifted digital data word to restore the original order of the bits at the input to the series of stages. A logic circuit may be included in each stage so that either a rotary or a multiply/divide shift occurs, depending upon the desired configuration as a barrel shifter or a multiply/divide by $2^N$ circuit.

The objects, advantages and other novel features of the present invention are apparent from the following detailed description when read in conjunction with the appended claims and attached drawing.

DESCRIPTION OF THE PREFERRED EMBODIMENT

Figure 1:
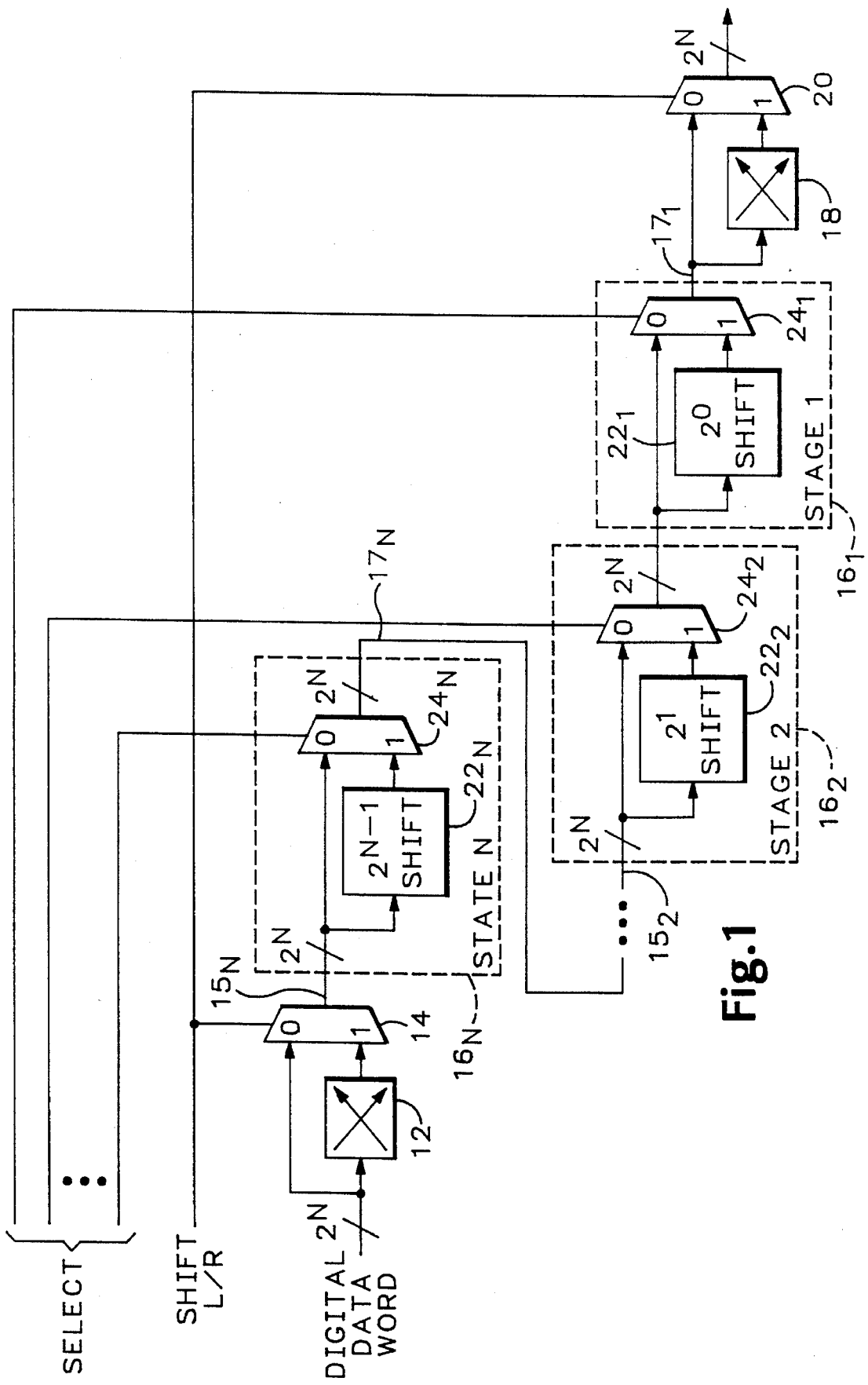
FIG. 1 is a block diagram view of a barrel shifter or multiply/divide IC structure according to the present invention.

Referring now to the FIG. 1 a digital data word having $2^N$ bits is input to an input bit reversal circuit 12 and to one input of an input reversal multiplexer 14. The input reversal multiplexer 14 represents $2^N$ one-bit multiplexers. The other input to the input reversal multiplexer 14 is from the output of the input bit reversal circuit 12. The output from the input reversal multiplexer 14 is input to the first $16_N$ of a plurality of stages 16 connected in series, each stage having an input 15 and an output 17. The output of each stage 16, except the last stage $16_1$, is coupled to the input of the next stage in the series. The output of the last stage $16_1$ is input to an output bit reversal circuit 18 and to one input of an output reversal multiplexer 20, also representing $2^N$ one-bit multiplexers. The other input to the output reversal multiplexer 20 is the output from the output bit reversal circuit 18, and the output from the output reversal multiplexer is the digital data word shifted to produce a barrel shifter output or a multiply/divide by $2^n$ output according to the particular configuration of the stages 16.

Each stage 16 has a shifter/rotator 22 and a stage multiplexer 24. The stage multiplexer 24 represents $2^N$ one-bit multiplexers. The input 15 of each stage 16 is coupled to the input of the shifter/rotator 22 and to one input of the stage multiplexer 24. The output of the shifter/rotator 22 is coupled to the other input of the stage multiplexer 24. The output of the stage multiplexer 24 is coupled to the output 17 for the stage 16. The shifter/rotator 22 provides a shift/rotation of $2^{x-1}$ bits where X is the stage number, the Nth stage $16_N$ being the input stage and stage one $16_1$ being the output stage. The shift/rotation performed by the shifter/rotator 22 may be hardwired so that no delay occurs during the shift/rotation operation.

Figure 2:
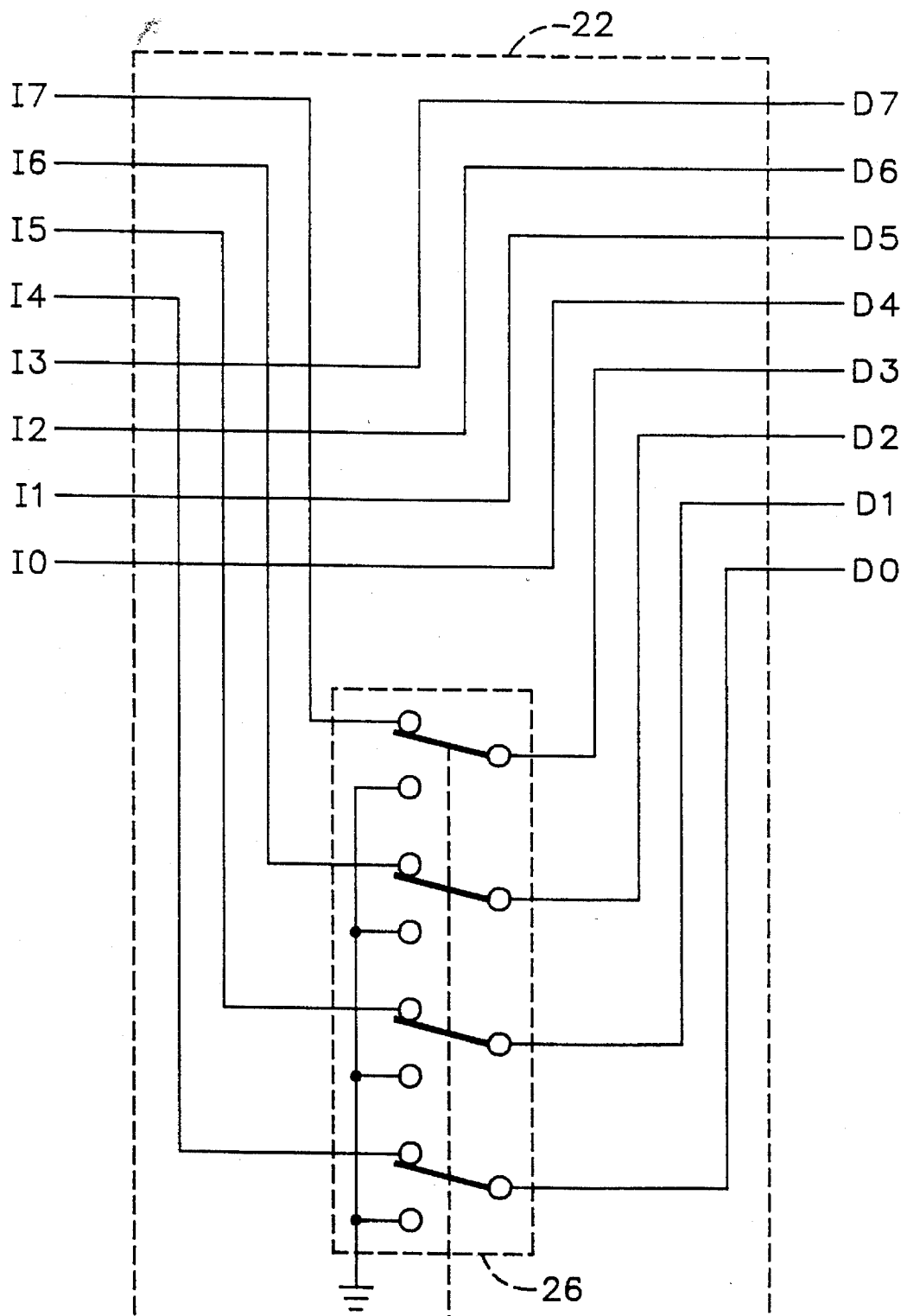
FIG. 2 is a schematic of a hardwired shifter for the barrel shifter or multiply/divide IC structure according to the present invention.

As shown in FIG. 2 logic 26 in the form of electronic switches may be included in the shifter/rotators 22 to select between a multiply/divide shift circuit and a rotary shift circuit. In any event without the additional logic the shifter/rotators 22 may be hardwired as indicated above according to the particular function desired for the circuit—barrel shifter or multiply/divide circuit. The logic 26 is an example of a shift by 4 where N=3 so that $2^{N-1}=2^2$. The ground inputs to the switch 26 provide zeros for multiply/divide operations.

In operation the input reversal multiplexer 14 selects either the digital data word or the reversed version of the digital data word from the input reversal circuit 12 for input to the input stage $16_N$ according to a shift left/right select command. The reversal circuits 12, 18 may be hardwired. A shift amount select command in the form of N bits, one for each stage multiplexer 24, determines whether the signal passes through each stage without shifting or is shifted by that particular stage. For example for an eight-bit digital data word, where N=3, there are three stages 16, with the input stage 16$_3$(16$_N$) providing a four-bit shift if selected by the appropriate bit of the shift amount select command. The intermediate stage 16$_2$ provides a two-bit shift and the output stage 16$_1$ provides a one-bit shift if selected by the appropriate bits of the shift amount select command. For barrel shifting the bits are wrapped around, while for multiply/divide the new bits are zeros, i.e., for barrel shifting a two-bit shift right of 00100101 produces 01001001 (shift right), while a two-bit multiply (shift left) of 00100101 produces 10010100. The total number of one-bit multiplexers that make up the input, output and stage multiplexers 12, 18, 24 is $2^N \times (2+N)$, where (2+N) represents the number N of stages 16 plus the input and output reversal multiplexers 14, 20, and $2^N$ represents the number of bits in the digital data word. For an 8-bit digital data word the total number of multiplexers is 8×5=40, while for the above-described prior art it is 8×8=64. The more the number of bits per digital data word, the greater the difference between the hardware of the present invention over the prior art (for 16 bits 16×6=96 as opposed to 16×16=256).

Thus the present invention provides a more efficient barrel shifter or multiply/divide IC structure by providing a hard-wired shifter/rotator in each stage which reduces the number of one-bit multiplexers required.

What is claimed is:

1. A digital data word shift circuit, comprising, a plurality of stages (16) coupled in series, including an input stage (16$_N$) and an output stage (16$_1$), each stage having an output (17$_N$ . . . (17$_2$, 17$_1$) and an input (15$_N$ . . . (15$_2$, 15$_1$), with the output (17) of each stage except the output of the output stage being coupled to the input (15) of the following stage, the input (15$_N$) of the input stage being coupled to receive a digital data word and the output (17$_1$) of the output stage providing a shifted digital data word, each stage having a shifter (22$_N$ . . . (22$_2$, 22$_1$) and a multiplier (24$_N$ . . . (24$_2$, 24$_1$), the input of each stage being coupled to an input of the shifter for that stage and to a first input of the multiplexer for that stage, an output of the said shifter being coupled to a second input of the said multiplexer, and an output of the said multiplexer being coupled to the output of that stage, means for controlling (SELECT) the multiplexers (24) so that a predetermined shift is produced by the stages upon the digital data word to produce the shifted digital data word, means for selecting (14) in response to a shift direction command (SHIFT L/R) between the digital data word and a reversed version of the digital data word for input to the input stage, and means for selecting (20) in response to the shift direction command between the shifted digital data word and a reversed version of the shifted digital data word from the output stage.

2. A digital data word shift circuit, comprising, a plurality of stages (16) coupled in series, including an input stage (16$_N$) and an output stage (16$_1$), each stage having an output (17$_N$ . . . (17$_2$, 17$_1$) and an input (15$_N$ . . . (15$_2$, 15$_1$), with the output (17) of each stage except the output of the output stage being coupled to the input (15) of the following stage, the input (15$_N$) of the input stage being coupled to receive a digital data word and the output (17$_1$) of the output stage providing a shifted digital data word, each stage having a shifter (22$_N$ . . . (22$_2$, 22$_1$) and a multiplier (24$_N$ . . . (24$_2$, 24$_1$), the input of each stage being coupled to an input of the shifter for that stage and to a first input of the multiplexer for that stage, an output of the said shifter being coupled to a second input of the said multiplexer, and an output of the said multiplexer being coupled to the output of that stage, and means for controlling (SELECT) the multiplexers (24) so that a predetermined shift is produced by the stages upon the digital data word to produce the shifted digital data word, wherein the number of bits in the digital data word is $2^N$, the number of stages is N, the shifter of the input stage shifts the digital data word by $2^{N-1}$ bits, and each subsequent shifter in the following stages shifts the digital data word from the prior stage one-half of the number of bits as the shifter for the prior stage.

3. A digital data word shift circuit, comprising, a plurality of stages (16) coupled in series, including an input stage (16$_N$) and an output stage (16$_1$), each stage having an output (17$_N$ . . . (17$_2$, 17$_1$) and an input (15$_N$ . . . (15$_2$, 15$_1$), with the output (17) of each stage except the output of the output stage being coupled to the input (15) of the following stage, the input (15$_N$) of the input stage being coupled to receive a digital data word and the output (17$_1$) of the output stage providing a shifted digital data word, each stage having a shifter (22$_N$ . . . (22$_2$, 22$_1$) and a multiplier (24$_N$ . . . (24$_2$, 24$_1$), the input of each stage being coupled to an input of the shifter for that stage and to a first input of the multiplexer for that stage, an output of the said shifter being coupled to a second input of the said multiplexer, and an output of the said multiplexer being coupled to the output of that stage, and means for controlling (SELECT) the multiplexers (24) so that a predetermined shift is produced by the stages upon the digital data word to produce the shifted digital data word, wherein each shifter (22) shifts the digital data word at the input of said shifter by a different amount at the output of said shifter as a function of the location of the stage (16) containing said shifter within the series-coupled plurality of stages and the total number of stages in said plurality of stages.

\* \* \* \* \*